United States Patent
Fellman

(10) Patent No.: US 11,205,104 B2
(45) Date of Patent: Dec. 21, 2021

(54) FLOATING MEMORY CARD CASE

(71) Applicant: Jeffrey S. Fellman, Sarasota, FL (US)

(72) Inventor: Jeffrey S. Fellman, Sarasota, FL (US)

( * ) Notice: Subject to any disclaimer, the term of this patent is extended or adjusted under 35 U.S.C. 154(b) by 0 days.

(21) Appl. No.: 16/203,206

(22) Filed: Nov. 28, 2018

(65) Prior Publication Data

US 2019/0164028 A1 May 30, 2019

Related U.S. Application Data

(60) Provisional application No. 62/591,449, filed on Nov. 28, 2017.

(51) Int. Cl.
  *G06K 19/00* (2006.01)
  *A45C 11/18* (2006.01)
  *A45C 13/00* (2006.01)

(52) U.S. Cl.
  CPC .......... *G06K 19/005* (2013.01); *A45C 11/18* (2013.01); *A45C 13/008* (2013.01); *A45C 2011/188* (2013.01)

(58) Field of Classification Search
  CPC . A45C 11/18; A45C 13/008; A45C 2011/188; G06K 19/005
  USPC .............................. 235/486; 206/307, 307.1
  See application file for complete search history.

(56) References Cited

U.S. PATENT DOCUMENTS

| | | | |
|---|---|---|---|
| 2006/0011436 A1* | 1/2006 | Orman | G11B 33/0444 190/100 |
| 2006/0144751 A1* | 7/2006 | Tsang | G11B 33/0438 206/707 |
| 2010/0038269 A1* | 2/2010 | Picard | A45C 11/18 206/307.1 |
| 2012/0043235 A1* | 2/2012 | Klement | A45C 13/008 206/320 |
| 2013/0139359 A1* | 6/2013 | Otten | F16L 1/24 24/16 R |
| 2017/0095065 A1* | 4/2017 | Colbert | B65D 43/22 |
| 2017/0287306 A1* | 10/2017 | King, Jr. | G01R 19/155 |
| 2018/0312323 A1* | 11/2018 | North | B65D 11/16 |

OTHER PUBLICATIONS

Mark, James. Physical Properties of Polymers Handbook. 2nd ed., Springer Science + Business Media, LLC, 2007. (Year: 2007).*

* cited by examiner

*Primary Examiner* — Suezu Ellis
(74) *Attorney, Agent, or Firm* — Charles McCloskey

(57) ABSTRACT

A floating case has a rigid layer and an alternate joined buoyant layer. The rigid layer has at least one chamber for a larger memory card and at least one minor chamber for a smaller memory card. Each chamber has first tabs, second tabs, and a tongue that secure a memory card. The buoyant layer displaces water so that the device floats and preferably has the rigid layer floating above the water. The device and its layers have a left end, a right end, a front, a back, a top surface, a bottom surface, a first corner and at least one second corner. The rigid layer and the buoyant layer have a waterproof construction and the buoyant layer has a light weight to volume ratio. In an alternate embodiment, the device has a hole through its top surface and the bottom surface for a lanyard.

9 Claims, 3 Drawing Sheets

FLOATING MEMORY CARD CASE

CROSS-REFERENCE TO RELATED APPLICATION

This non-provisional application claims priority to provisional application No. 62/591,449 filed on Nov. 28, 2017, all of which are owned by the same inventor.

BACKGROUND OF THE INVENTION

The floating memory card case generally relates to camera accessories and more specifically to cases, such as holders, for computer memory cards that float.

Early computers operated upon punched cards. The cards had a weight of cardstock and a distinctive shape. The punched cards contained program instructions in a certain sequence. Cards that fell out of order corrupted a program loaded into a computer. Programmers would use various tactics to keep cards in order such as a drawing made upon an edge of a deck of punched cards. Time has overtaken the punched card.

Programs and data load then loaded upon computers using cassette tapes and floppy disks. The cassette tapes came from the music recording industry and the floppy disks developed from winchester drives. The floppy disks had a thin polymer envelope generally back. People labeled floppy disks using a variety of adhesive labels commonly available at office supply outlets. In time, floppy disks decreased in size to 3½ inch width and increased capacity to 1.44 MB. However, software and data continued to multiply.

Vendors of computer products and eventually users of computers placed programs upon optical discs read by various drives. The optical discs generally had a translucent, or transparent in some instances, appearance. The optical discs reached read write ability and approximately 720 MB storage capacity. However, software and data continued to multiply.

With the advent of the Internet and build out of communications networks, vendors and users of programs and data transmitted both through the Internet. The transmissions occurred as email attachments, file transfer protocol uplinks, and direct connection, computer to computer, on a local area network. Presently, cloud storage has become available where programs and data reside on immense third party servers and vendors and users of programs and data access programs and data remotely.

However, accessing cloud storage calls for a robust communications network. In the absence of such a network, the programs and data in the cloud become inaccessible. Without a nearby tower or a clear line of sight, cloud data does not display upon wifi devices such as smartphones and tablets.

Meanwhile, solid state memory devices have developed. These devices store programs and data on drives without moving parts. These devices have ever growing capacities presently about 128 GB. Such devices can hold plenty of programs and data. The devices often take the form of cameras suitable for digital photography. Digital cameras utilize select optical lenses and digital imagery to capture scenes whether still or in motion. Depending upon resolution, a digital camera may have many low resolution pictures in a storage device or few high resolution pictures in a storage device. A series of digital pictures forms an eventual movie. Such a series has plenty of pictures. Presently, people take plenty of pictures with digital cameras. More often than not, people fill a storage device, or memory card, with pictures more quickly than planned. Photographers and videographers on locations readily fill memory devices. Such persons quite often find themselves handling many memory devices and struggling to store them. Such persons near water face the additional risk of a memory device becoming submerged and never being seen again. Alas, the picture or movie on a lost memory device may have a high value.

DESCRIPTION OF THE PRIOR ART

Traditionally, people have collected memory devices, hereinafter SD cards, in one place and then packaged the SD cards. The packaging may be an envelope, box, vinyl sleeve, various holders, and the like. Each person organizers his cards in his own way. With SD cards multiplying through usage and plenty of picture taking, a person quickly has many SD cards to store, retrieve, and manage. SD cards come in select sizes established by their manufacturer in coordination with device makers. Generally the sizes are small compared to a person's fingers, typically a large size about the shape of a postage stamp and a small size about one quarter the stamp size. Such small items readily succumb to loss and prove difficult to label or otherwise mark.

The present invention overcomes the difficulties of storing and organizing a plurality of memory devices, such as SD cards, subject to expanding data needs particularly near water. The present invention has its device that prevents submerging in water and allows a user to see the device and retrieve it.

SUMMARY OF THE INVENTION

Generally, the present invention provides a device with a rigid layer and a joined buoyant layer. The rigid layer has at least one chamber for a larger memory card and at least one minor chamber for a smaller memory card. Each chamber and minor chamber has a pair of first tabs, a pair of second tabs, and a foot that secure a memory card placed into each chamber and minor chamber. The buoyant layer displaces water so that the device floats and preferably has the rigid layer floating above a water surface. The device and its layers have a left end, a right end, a front, a back, a top surface, a bottom surface, a first corner and at least one second corner. The rigid layer and the buoyant layer have a waterproof construction and the buoyant layer has a low weight to volume ratio. For safekeeping, in an alternate embodiment, the device has a hole through its top surface and the bottom surface for a lanyard.

Forgetful or clumsy as some people can be, people will choose a device that helps remedy those misgivings, particularly around water. The present invention stores the abundance of memory cards filled during shooting of a digital movie. The present invention also floats on water so that memory cards stored upon it do not sink to the bottom of a body of water, never to be found.

The present invention applies immediately in the memory card, photographic, video, and movie industries as more and more users take digital cameras upon, into, and around water. The present invention utilizes a layer of selected density and a rigid layer that receives memory including but not limited to SD cards, microSD cards and SIM cards.

The present invention utilizes two principles. First, being the natural displacement of water from a volume and second, that that volume of water exceeds the weight of a combined buoyant layer, rigid layer, and memory card cargo. The buoyant layer remains closed and does not become wet and soggy. While the rigid layer stores the memory cards above the buoyant layer.

There has thus been outlined, rather broadly, the more important features of the invention in order that the detailed description thereof that follows may be better understood and that the present contribution to the art may be better appreciated. The present invention also includes self-righting capability, additional chambers, additional minor chambers, and variations in buoyancy from positive to neutral. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved floating memory card case for portable memory.

Another object is to provide such a floating memory card case that floats in freshwater and in saltwater.

Another object is to provide such a floating memory card case that stores and releases portable memory with a minimum of user action.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a floating memory card case for memory cards of electronic equipment, typically cameras. The present invention provides a case with sufficient displacement so that it floats when fully loaded with the heaviest memory cards.

Figure 1:
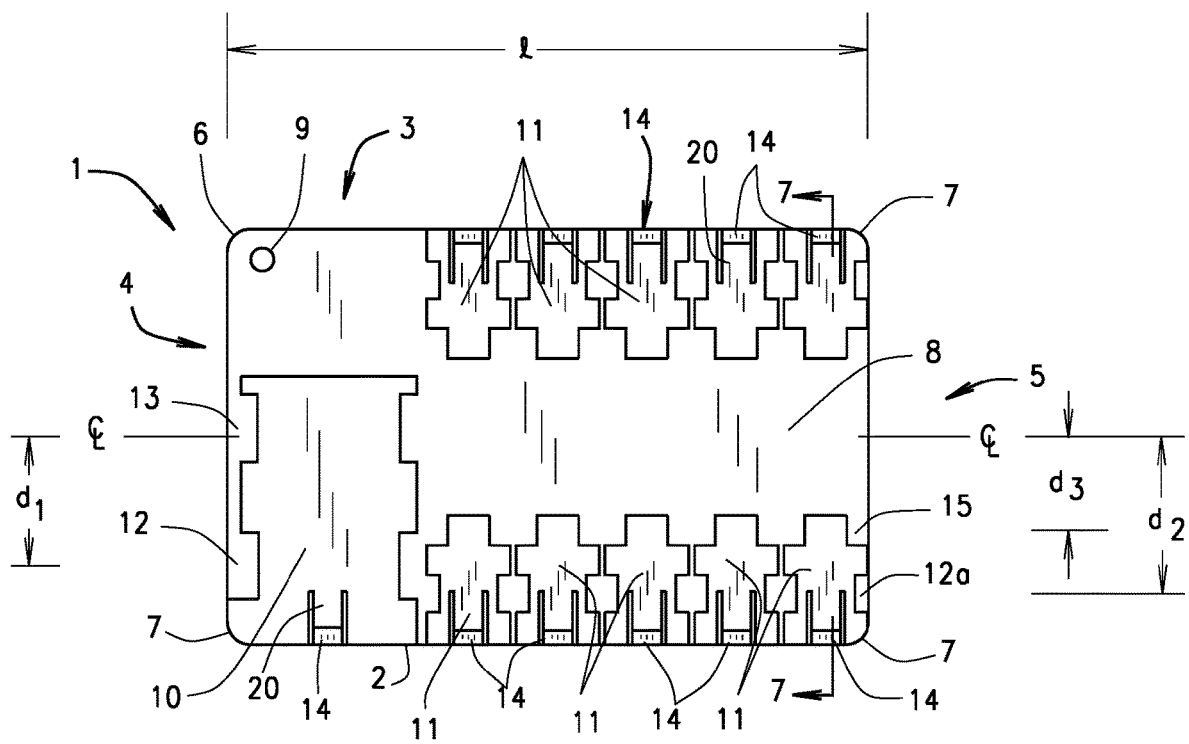
FIG. 1 shows a top view of the present invention.

FIG. 1 shows a top view of the invention 1 having a size similar to that of a North American credit card, though not confined to that size. The invention, or case, has a generally rectangular shape with a front 2 and a mutually parallel and spaced apart back 3, or edge, and a left end 4 and a mutually parallel and spaced apart right end 5. The invention has a length, as at l, generally the long dimension of the invention here shown as left to right, and a centerline, as at ₵, parallel to the length, that is, the front and the back. The left end and the right end are generally perpendicular to the front and the back as shown. The back and the left end merge at a first corner 6 and the left end and the front merge at a second corner 7. The front and the right end, and the right end and the back also each merge at a second corner 7 as well. The first corner and the second corners generally have a rounded shape. A top surface 8 spans between the left end and the right end, and the front and the back, and occupies the foreground in this view. The top surface near the first corner has a hole 9 through the device that receives a lanyard or other keeper, not shown. The top surface also has a chamber 10 away from the second corner 7 at the merge of the left end 4 and the front. The chamber has a nearly rectangular shape with its length oriented transverse to the length of the device. Along the front outwardly, or away, from the chamber and towards the right end, the top surface has a plurality of minor chambers 11, here shown as five in number. The minor chambers also have a nearly rectangular shape but with a length slightly less than half of the length of the chamber 10 and a much narrower width. Opposite the minor chambers 11 upon the front 2, the invention 1 has another set of minor chambers 11 upon the back 3 generally in registration as shown. The sets of minor chambers appear as rows outwardly, or away, from the chamber. The minor chambers receive a small size memory card and the chamber receives a large size memory card.

More particularly, the chamber 10 has a volume recessed into the top surface 8 of sufficient depth for a memory card. The chamber then has first tabs 12 generally mutually opposite and outwardly from the centerline a first distance as at $d_1$, and one first tab locating near a second corner and two second tabs 13 away from the first tabs, located upon the centerline. The first tabs and the second tabs have the same length measured parallel to the left end 4 and the same depth measured parallel to the front. The first tabs and the second tabs have a thickness less than that of the top surface 8 so that a memory card may slide beneath the first tabs and the second tabs and rest within the top surface. The first tabs and the second tabs form a recess at the bottom of the chamber so a memory card may be inserted therein. Outwardly from the first tabs towards the front, the chamber has a tongue 20 of a small rectangular shape extending outwardly from the centerline. The tongue separates upon three sides from the top surface as a cantilever so that it bends slightly during use. The tongue 20 has a small lip 14 proximate the front 2 so that a memory card may rest against the lip and prevent the card from sliding out of the chamber. The lip extends upwardly and opposite the buoyant layer.

And more particularly, each minor chamber 11 also has a volume recessed into the top surface of sufficient depth for a small memory card, typically the same depth as the chamber 10. The minor chamber also has its first tabs 12a generally opposite, and outwardly from the centerline a second distance as at $d_2$, and two third tabs 15 outwardly from the centerline a third distance as at $d_3$ where the third distance is less than the second distance and the third tabs forming a corner of the minor chamber. The first tabs and the third tabs have the same length measured parallel to the left end 4 and the same depth measured parallel to the front. The first tabs and the third tabs of the minor chamber have a thickness less than that of the top surface 8 so that a small memory card may slide beneath the first tabs and the third tabs and rest within the top surface. The first tabs and the third tabs form a recess at the bottom of the minor chamber so a memory card may be inserted therein. Outwardly, or away, from the first tabs towards the front, or alternatively the back as shown, each minor chamber also has a tongue 20 of a small rectangular shape extending outwardly from the centerline. The tongue separates upon three sides from the top surface as a cantilever so that it bends slightly during use. The tongue 20 has a small lip 14 proximate the front 2, or the back 3, so that a small memory card does not slide out of the chamber. Adjacent minor chambers have their first tabs 12a and third tabs 15 generally upon a common spine or divider as shown. Beneath the lips, another layer may be seen in this figure. As before, each lip extends upwardly and opposite the buoyant layer. In the preferred embodiment, the invention has one chamber towards the left of the front, a row of five minor chambers to the right of the chamber, and a second row of five minor chambers opposite the first row, that is, towards the back, as shown. The preferred embodiment has the lips aligned for each row of minor chambers and the lips of the first row aligned with the lip of the chamber. Because of the chamber and the minor chambers, the invention may hold memory cards of two sizes.

Figure 2:
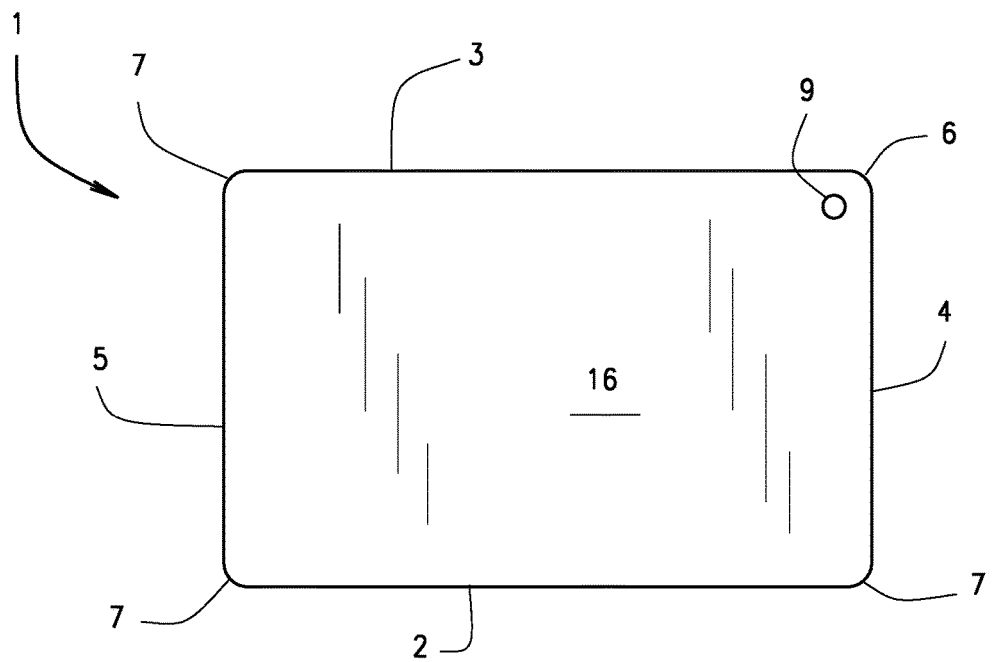
FIG. 2 shows a bottom view of the present invention.

FIG. 2 shows a bottom view of the invention with its bottom surface 16 in the foreground. The bottom surface generally extends upon the entire invention from the left end 4 to the right end 5, and the front 2 to the back 3 and also follows the first corner 6 and the second corners 7 as shown. The bottom surface also admits hole 9 through it for a lanyard, not shown, as previously described. The bottom surface contributes to the floatation ability of this invention.

Figure 3:
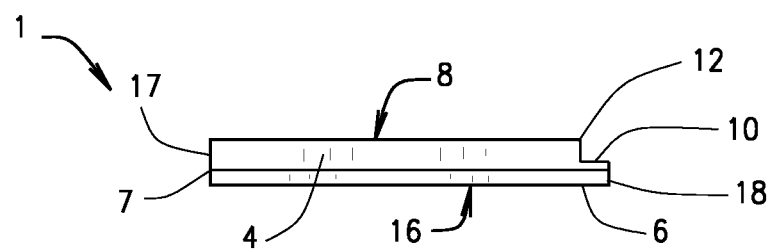
FIG. 3 provides a side view of the present invention.

Turning the invention, FIG. 3 shows the left end 4 in the foreground and a second corner 7 to the left and a first corner 6 to the right. The chamber 10 opens in the top surface 8 to the right as well. The top surface 8 is the uppermost surface of a rigid layer 17, typically planar and flat, typically polymer though other materials may see use, that has the chamber 10 and minor chambers 11 formed therein. The rigid layer has its thickness measured normal to the top surface. The chamber shown here has a slight recess away from the first corner 6. This occurs because a first tab 12 has its location away from the first corner which causes an apparent step in the width of the rigid layer.

Beneath the rigid layer, the invention has a buoyant layer 18 with the bottom surface outwardly, or away, from the invention and opposite the top surface 8. The buoyant layer joins to the rigid layer from the left end to the right end and from the front to the back as previously shown in FIG. 2, except for the hole 9. The buoyant layer has a waterproof joining to the rigid layer such as by resins, adhesives, cohesives, thermal welding and select mechanical fastening such as punching or riveting. The buoyant layer generally also is waterproof itself and does not admit water into its construction. The buoyant layer joins the rigid layer beneath the chamber and the minor chambers. The buoyant layer creates additional displacement, that is, volume of the device but at little increase in weight. The buoyant layer operates to float the invention on freshwater and on saltwater when loaded fully with memory cards. The buoyant layer displaces a volume of water that exceeds the weight of itself, the rigid layer, and the memory cards stored onboard. In the preferred embodiment, the buoyant layer lifts the rigid layer completely above the surface of water upon immersion of the invention. In an alternate embodiment, the buoyant layer prevents the top surface from immersing into the surface of water upon deploying the invention.

More particularly, for the floating memory card case, its center of gravity should be above its center of buoyancy, shown by a distance $y_{bg}$. Center of buoyancy is the center of gravity for the water volume displaced by an object, here the case, as at V. Center of gravity is from the weight of the case 1 itself plus any cargo, such as SD cards, as at I. When the case tips to either side on water, its center of gravity above the center of buoyancy causes the case of the invention to right itself. This self-righting happens when the buoyant force of the tipped case intersects the tipped case's centerline at a point called the metacenter, generally above the case a distance as at $h_m$. The floating memory card case of the present invention keeps a portion of its front 2, back 3, left end 4, and right end 5 and as much of its top surface 8 above water as possible as suggested by the following equation:

$$h_m = \frac{I}{V} \pm y_{bg} \qquad \text{Equation 1}$$

At a minimum the invention has a neutral buoyancy when loaded in the chamber and each minor chamber. Preferably, the invention has positive buoyancy when loaded in the chamber and each minor chamber with memory cards. That is, the invention has a density less than that of freshwater. Preferably, the invention self-rights. During use when loaded with memory cards, the invention has a draft less than fifty per centum of its thickness 22 later shown in FIG. 7.

Figure 4:
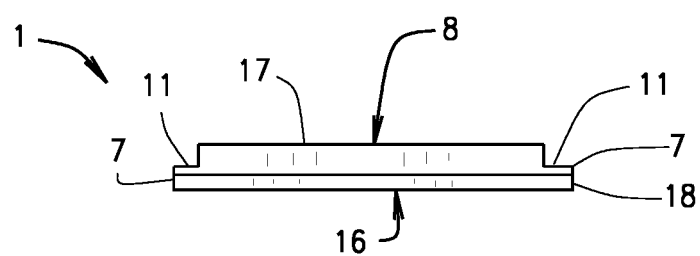
FIG. 4 provides a side view of the present invention opposite that of FIG. 3.

Turning to the other end, FIG. 4 shows the right end 5 in the foreground. This end 5 appears generally symmetric with two spaced apart second corners 7 and the buoyant layer 18 spanning between them. The rigid layer joins to the buoyant later but has two minor chambers 11 formed near the second corners. The minor chambers shown opening here appear to have a slight recess away from the second corners 7 because their first tabs 12a have their location away from the second corner which causes an apparent step in the width of the rigid layer at the front 2 and the back 3 as shown. The buoyant layer has its same dimensions and buoyancy characteristics as described above.

Figure 5:
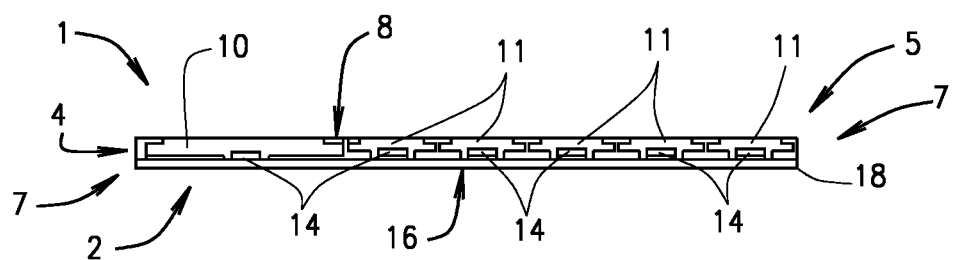
FIG. 5 illustrates a front view of the present invention.

Rotating the invention once more, FIG. 5 presents the front 2 in the foreground with the chamber 10 to the left and five minor chambers 11 spaced towards the right. The chamber and each minor chamber have their lips 14 forward and terminating at the front. The front spans from the left end 4 to the right end 5 as shown with the chamber towards the left end and the last minor chamber towards the right end. The chamber has its depth here shown as slightly greater than the depth of the adjacent minor chambers. The minor chambers each have a pair of first tabs 12a orienting towards each other as shown for each minor chamber. Then the chamber has its pair of first tabs 12 orienting towards each other as shown and the first tabs of the chamber as at 12 and the minor chambers as at 12a appear coplanar. Also, each tongue and appurtenant lip may deflect in its chamber and minor chamber so that it bends downward, towards the buoyant layer, upon insertion of a memory card over the lip of each tongue and then rebounds upwardly, away from the buoyant layer as the lip grips the bottom edge of a memory card for securement.

Figure 6:
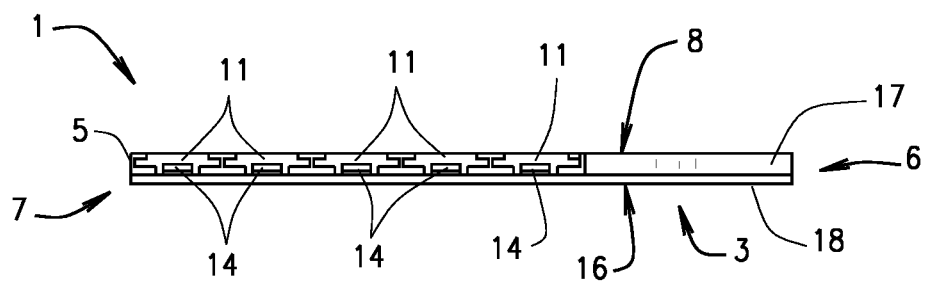
FIG. 6 illustrates a back view of the present invention.

FIG. 6 shows the back 3 of the invention in the foreground. The back has five minor chambers 11 shown at the left of the figure and extending along the back 3 but not reaching the first corner 6 at the left end 4, here to the right of the figure. Each minor chamber 11 has its lip 14 at the back. Each tongue bends downwardly to receive a memory card and then returns upwardly so its lip engages the bottom edge of a memory card securely against sliding out from the invention.

Figure 7:
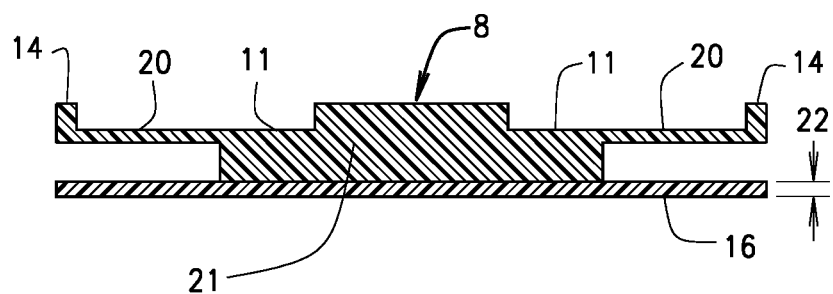
FIG. 7 shows a sectional view through the present invention.

And, FIG. 7 has a sectional view through the invention generally parallel to the right end 5 and the left end 4. This view extends from the lips 14 of the front to the lips 14 of the back. Each tongue 20 has a lip 14 generally outwardly from the remainder of the invention. The lip has the largest thickness upon the tongue 20. Away from the lip, the tongue has a lesser thickness than the lip but at least three times as long as the lip. The tongue behind each lip extends into the plane of the minor chamber 11. The lip is upon the bottom of the minor chamber and spaced below the first tabs 12a previously shown. The spacing between the tongue and the bottom of the minor chamber admits an SD card therein while the lip has sufficient thickness to grip an edge of an SD card. The minor chambers extend into a spine 21 of the invention that defines the thickness of the rigid layer 17 that exceeds the height of the minor chamber. The spine extends from the right side 5 to an inside of the chamber 10 as previously shown in FIG. 1. Beneath the spine 21 and the minor chambers 11 in this figure, the invention has its buoyancy layer, or float 18, as before. The float extends beneath the entire spine 21, the tongues 20, the lips 14, the minor chambers 11, and approximates the typical credit card shape. The buoyant layer has a thickness as at 22 generally less than the thickness of the spine 21.

From the aforementioned description, a floating memory card case has been described. The floating memory card case is uniquely capable of floating a collection of memory cards so that a user may see the invention and retrieve it from an aqueous related location, such as a river, lake, ocean, beach, and the like. The floating case may see application upon devices manufactured from many materials, beyond those preferred, including but not limited to, polymers, polyvinyl chloride, polyethylene, polypropylene, urethane, nylon, rubber, latex, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A floating device comprising:
a planar rigid layer, said rigid layer having at least one chamber therein and at least one minor chamber adjacent said at least one chamber, wherein said device is adapted to hold memory cards of at least one size;
said floating device having an edge, a length along the edge, and a centerline parallel to the edge;
said at least one chamber having at least one first tab located a first distance away from said centerline and closer to the edge and at least one second tab located upon said centerline;
wherein said at least one first tab and said at least one second tab form a recess so that said at least one chamber is adapted to receive a memory card inserted therein beneath said at least one first tab and said at least one second tab;
said at least one minor chamber having at least one first tab located a second distance away from said centerline and closer to the edge and at least one third tab located a third distance away from said centerline wherein the third distance is less than the second distance; and
wherein said at least one first tab of said minor chamber and said at least one third tab form a recess so that said at least one minor chamber is adapted to receive a memory card inserted therein.

2. The floating device of claim 1 further comprising:
said at least one chamber having a tongue centered upon said at least one chamber and away from the centerline, said tongue away from said at least one chamber as a cantilever, said tongue having a lip opposite said at least one chamber, said lip extending upwardly and opposite said buoyant layer;
said at least one minor chamber having a tongue centered upon said at least one minor chamber and spaced away from the centerline, said tongue away from said at least one minor chamber as a cantilever, said tongue having a lip opposite said at least one minor chamber, said lip extending upwardly and opposite said buoyant layer; and
wherein said lip of said tongue of said at least one chamber and said lip of said tongue of said at least one minor chamber is adapted to abut a memory card inserted into said at least one chamber and said at least one minor chamber respectively.

3. The floating device of claim 1 further comprising:
five minor chambers in mutual alignment with said lips of each of said tongues of each of said minor chambers being collinear, said five minor chambers forming a first row along the edge of said floating device;
five minor chambers in mutual alignment with said lips of each of said tongues of each of said minor chambers being collinear, said five minor chambers forming a second row opposite the edge having said first row of five minor chambers; and
wherein said floating device is adapted to hold memory cards of two sizes.

4. A device that stores memory cards comprising:
a planar buoyant layer;
a planar rigid layer mutually parallel to and above said buoyant layer, said rigid layer joining to said buoyant layer, said rigid layer having at least one chamber therein;
wherein said device floats on freshwater and on saltwater;
said device that stores memory cards having an edge, a length along the edge, and a centerline parallel to the edge;
said at least one chamber having at least one first tab located a first distance away from said centerline and closer to the edge and at least one second tab located upon said centerline;
said at least one first tab and said at least one second tab forming a recess so that said at least one chamber is adapted to receive a memory card inserted therein;
said at least one chamber having a tongue centered upon said at least one chamber and away from the centerline, said tongue away from said at least one chamber as a cantilever, said tongue having a lip opposite said at least one chamber, said lip extending upwardly and opposite said buoyant layer; and wherein said lip of said tongue of said at least one chamber is adapted to abut a memory card inserted into said at least one chamber.

5. The device that stores memory cards of claim 4 further comprising:

said rigid layer having two chambers mutually opposite the centerline and coplanar.

6. The device that stores memory cards of claim 4 further comprising:

said rigid layer having at least one chamber therein and at least one minor chamber therein adjacent said at least one chamber;

said at least one minor chamber having at least one first tab of said minor chamber located a second distance away from said centerline and closer to the edge and at least one third tab of said minor chamber located a third distance away from said centerline wherein the third distance is less than the second distance;

said at least one minor chamber having a tongue centered upon said at least one minor chamber and away from the centerline, said tongue away from said at least one minor chamber as a cantilever, said tongue having a lip opposite said at least one minor chamber, said lip extending upwardly and opposite said buoyant layer;

said at least one first tab of said minor chamber and said at least one third tab forming a recess so that said at least one minor chamber is adapted to receive a memory card inserted therein; and wherein said lip of said tongue of said at least one minor chamber is adapted to abut a memory card inserted into said at least one minor chamber.

7. The device that stores memory cards of claim 6 further comprising:

five minor chambers in mutual alignment with said lips of each of said tongues of each of said minor chambers being collinear, said five minor chambers forming a first row along the edge;

five minor chambers in mutual alignment with said lips of each of said tongues of each of said minor chambers being collinear, said five minor chambers forming a second row opposite the edge having said first row of five minor chambers; and wherein said device that stores memory cards is adapted to hold memory cards of two sizes.

8. A floating device comprising:

a rigid layer, said rigid layer having at least one chamber therein and at least one minor chamber adjacent from said at least one chamber;

said floating device having an edge, a length along the edge, and a centerline parallel to the edge;

said at least one chamber having at least one first tab located a first distance away from said centerline and closer to the edge and at least one second tab located upon said centerline wherein said at least one first tab of said chamber and said at least one second tab of said chamber forming a recess so that said at least one chamber is adapted to receive a memory card inserted therein;

said at least one minor chamber having at least one first tab located a second distance away from said centerline and closer to the edge and at least one third tab located a third distance away from said centerline wherein the third distance is less than the second distance, wherein said at least one first tab of said minor chamber and said at least one third tab of said minor chamber forming a recess so that said at least one minor chamber is adapted to receive a memory card inserted therein;

said at least one chamber having a tongue centered upon said at least one chamber and away from the centerline, said tongue away from said at least one chamber as a cantilever, said tongue having a lip opposite said at least one chamber, said lip extending upwardly and opposite said buoyant layer;

said at least one minor chamber having a tongue centered upon said at least one minor chamber and away from the centerline, said tongue away from said at least one minor chamber as a cantilever, said tongue having a lip opposite said at least one minor chamber, said lip extending upwardly and opposite said buoyant layer;

wherein said lip of said tongue of said at least one chamber and said lip of said tongue of said at least one minor chamber is adapted to abut a memory card inserted into said at least one chamber and said at least one minor chamber;

wherein said floating device is adapted to hold memory cards of two sizes;

a buoyant layer joining to said rigid layer beneath said at least one chamber and said at least one minor chamber, said buoyant layer joining to said rigid layer using one of an adhesive, cohesive, thermal welding, and mechanical fastener, wherein said floating device has at least a neutral buoyancy, floats on freshwater and on saltwater, and self-rights;

said floating device floating with said rigid layer above said buoyant layer;

said floating device having a center of buoyancy and a center of gravity further upwardly from said rigid layer than said center of buoyancy; and said floating device having a draft less than fifty per centum of its thickness when loaded.

9. The floating device of claim 8 further comprising:

five minor chambers in mutual alignment with said lips of each of said tongues of each of said minor chambers being collinear, said five minor chambers forming a first row along the edge; and five minor chambers in mutual alignment with said lips of each of said tongues of each of said minor chambers being collinear, said five minor chambers forming a second row opposite the edge having said first row of five minor chambers.

* * * * *